United States Patent [19]

Fairman et al.

[11] Patent Number: 4,828,434

[45] Date of Patent: May 9, 1989

[54] DEVICE, APPARATUS AND METHOD FOR DISTRIBUTION OF FLUID AND SELECTIVE MOVEMENT OF ARTICLES THEREBY

[75] Inventors: F. Eugene Fairman, Lakewood; William D. Jones, Wheat Ridge, both of Colo.

[73] Assignee: Goldco Industries, Inc., Loveland, Colo.

[21] Appl. No.: 91,599

[22] Filed: Aug. 31, 1987

[51] Int. Cl.$^4$ .............................................. B65G 53/04
[52] U.S. Cl. ......................................... 406/88; 406/87
[58] Field of Search ..................... 406/86, 87, 88, 89, 406/90, 91, 136, 137, 138

[56] References Cited

U.S. PATENT DOCUMENTS

| | | |
|---|---|---|
| 3,105,720 | 10/1963 | Barker . |
| 3,180,688 | 4/1965 | Futer .................... 406/88 |
| 3,475,058 | 10/1969 | Sanders . |
| 3,477,764 | 11/1969 | Smith ..................... 406/88 |
| 3,647,266 | 3/1972 | Hurd et al. ............. 406/88 X |
| 3,684,327 | 8/1972 | Hurd . |
| 3,734,567 | 5/1973 | Fong . |
| 3,953,076 | 4/1976 | Hurd . |
| 3,975,057 | 8/1976 | Hurd . |
| 3,999,806 | 12/1976 | Hurd . |
| 4,010,981 | 3/1977 | Hodge . |
| 4,229,861 | 10/1980 | Campo et al. . |
| 4,347,022 | 8/1982 | Lenhart ................ 406/88 |
| 4,369,005 | 1/1983 | Lenhart . |
| 4,392,760 | 7/1983 | Futer . |
| 4,500,229 | 2/1985 | Cole et al. . |
| 4,561,806 | 12/1985 | Lenhart ................ 406/88 |
| 4,568,223 | 2/1986 | Lenhart ................ 406/88 |
| 4,730,956 | 3/1988 | Lenhart ................ 406/88 |
| 4,732,513 | 3/1988 | Lenhart ................ 406/88 |

Primary Examiner—Sherman D. Basinger
Assistant Examiner—Paul E. Salmon
Attorney, Agent, or Firm—Robert E. Harris

[57] ABSTRACT

A device, apparatus and method for distribution at a utilization area of fluid maintained adjacent thereto under pressure to thereby effect movement of articles at the utilization area are disclosed. The device includes a thin plate having a plurality of spaced passageways extending therethrough, which passageways extend substantially normal and open to the opposite surfaces of the plate, with at least a portion of the passageways opening into one of the surfaces at different ones of a plurality of spaced displacements therein, whereby the configuration of the displacements and the size and position of the openings therein determine the volume and direction of fluid distributed in the utilization area. The device is particularly useful in an apparatus wherein the device forms the upper surface of an air containment chamber for containment of air under pressure, and wherein articles are moved thereby adjacent to the upper surface, for example in an air table, air conveyor, article single filer, or the like.

22 Claims, 2 Drawing Sheets

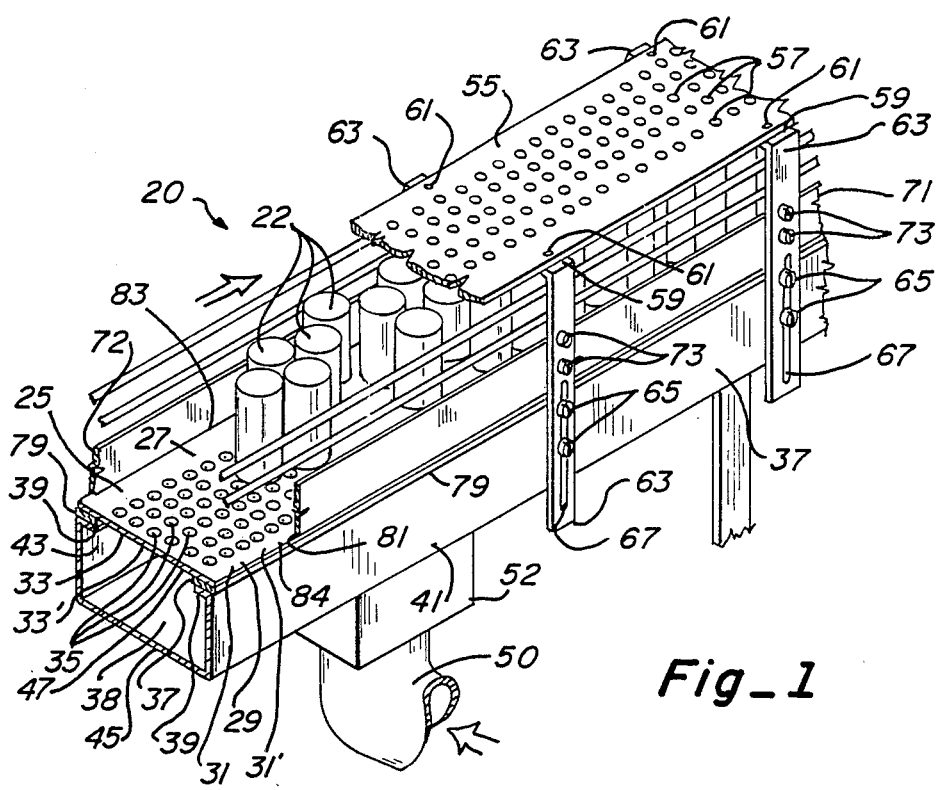
*Fig_1*
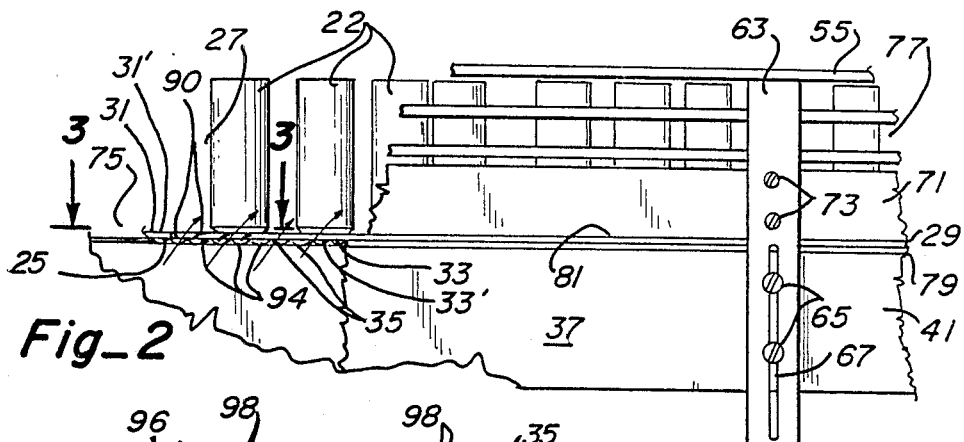
*Fig_2*
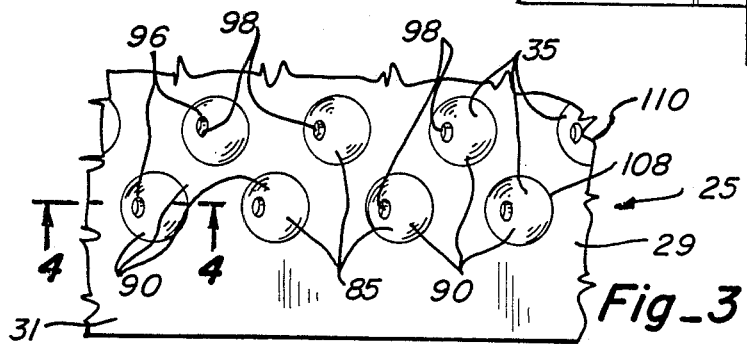
*Fig_3*

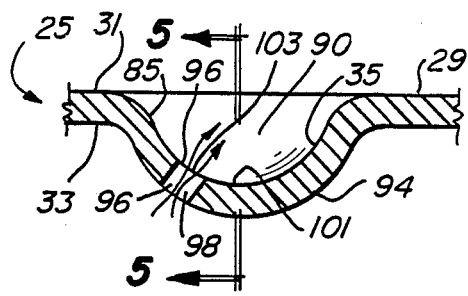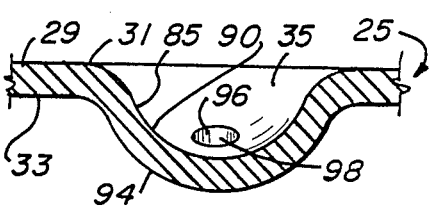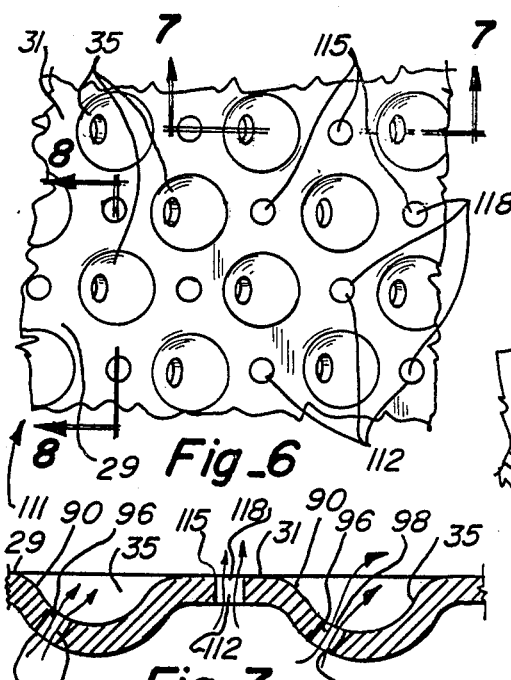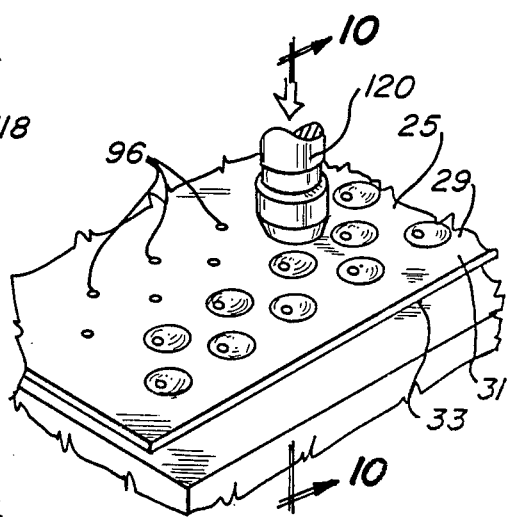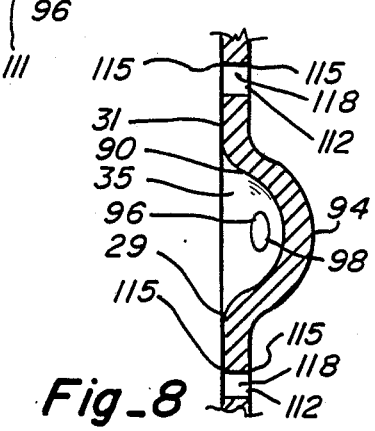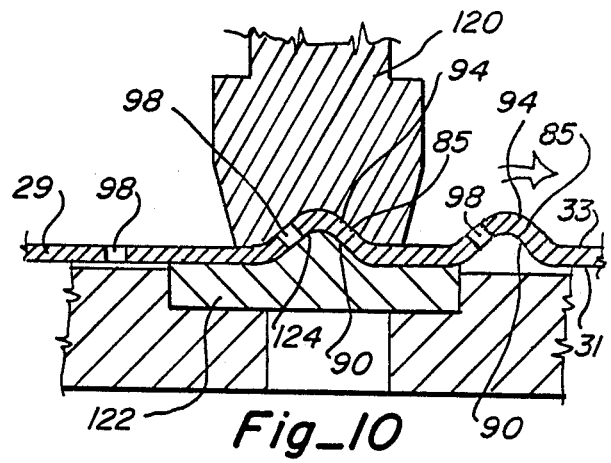

DEVICE, APPARATUS AND METHOD FOR DISTRIBUTION OF FLUID AND SELECTIVE MOVEMENT OF ARTICLES THEREBY

FIELD OF THE INVENTION

The present invention relates generally to article handling, and, more particularly, relates to a device, apparatus and method for selectively distributing air to thereby cause desired movement of articles adjacent to a surface.

BACKGROUND OF THE INVENTION

Devices for movement of cylindrical articles, for example cans, bottles, and the like, utilizing air jets are well known and have been heretofore suggested and/or utilized (see, for example, U.S. Pat. Nos. 4,500,229, 4,369,005, 3,475,058, 3,684,327, 3,953,076, 3,734,567, and 4,392,760), and such devices have heretofore included air tables, air conveyors and the like having a plurality of such jets positioned in recesses, or depressions, in a surface adjacent the articles to be moved.

While such devices now known have been found to be acceptable for some uses, some such devices have been found to impart excessive velocity to articles such as empty beverage cans thereby causing the articles to overturn, to suffer excessive energy loss at the jet due to friction and/or turbulence in a channel leading to the jet opening, and/or have been unduly complex in production.

For example, such devices have included jets positioned in cavities in a jet plate, with passageways between a plenum and the jet openings being angularly bored through the plate, and/or jet plates having openings defined therethrough so that fluid flow from the jets is at an angle of 45° or less, relative to the jet plate. As may be appreciated, further improvements in such devices may, therefore, still be utilized.

SUMMARY OF THE INVENTION

This invention provides a device, apparatus and method for selective distribution at a utilization area of fluid maintained adjacent thereto under pressure to thereby effect desired movement of articles at the utilization area, which simplifies manufacture and promotes product quality. More particularly, the device includes a plate having a plurality of openings therethrough, with each one of the plurality of openings residing in a separate depression at one surface of the plate formed by a plurality of spaced displacements in the plate. By preselection of the size of the openings, configuration of the depressions (i.e., the depths and diameters thereof) and positioning of the depressions with respect to the openings, predetermined volume and directions of distribution of fluid in the utilization area can be achieved.

It is therefore an object of this invention to provide a device, apparatus and method for selective distribution of fluid at a utilization area.

It is another object of this invention to provide a device for selective distribution of fluid at a utilization area which simplifies manufacture and promotes product quality.

It is still another object of this invention to provide a device and apparatus for selective distribution of air at a utilization area for movement of articles thereat which includes a thin plate having a plurality of spaced openings, or passageways, therethrough of a preselected size positioned in a plurality of spaced depressions in the plate having a preselected configuration, wherein the preselected size, positioning and configuration of the openings and depressions effects distribution of a predetermined volume of air in predetermined directions at the utilization area.

It is still another object of this invention to provide a device and apparatus for selected distribution of air at a first preselected area from a second preselected area for movement of cylindrical articles thereat wherein the direction of distribution of the air through initially substantially perpendicularly oriented passageways in a plate adjacent to the utilization area is effected by subsequent selective deformation of oppositely facing surfaces established by the plate, thereby requiring that no angular orientation be imparted to the passageways when the plate is initially perforated to make the openings during the process of manufacturing the device and apparatus.

It is yet another object of this invention to provide a device and apparatus for selective distribution of a predetermined volume of fluid in predetermined directions at a utilization area for desired movement of articles thereat wherein the device is made readily interchangeable with differently configured devices to provide distribution of a different predetermined volume of fluid and/or different direction of distribution for movement of differently configured articles, and wherein the apparatus includes a novel means for releasably securing the devices in the apparatus.

It is still another object of this invention to provide a method of manufacturing a device for selective distribution at a utilization area of fluid maintained adjacent thereto under pressure for movement of articles at the utilization area.

It is yet another object of this invention to provide a method for distributing a predetermined volume of air in a predetermined direction at a utilization area from a supply of air maintained adjacent thereto under pressure for desired movement of cylindrical articles at the utilization area.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the now preferred embodiment of the device and apparatus for selective distribution of fluid at a utilization area illustrating use thereof for movement of cylindrical articles;

FIG. 2 is a side view of the device and apparatus of FIG. 1 and having a cut away portion for further illustrating the device and the sealing and securing thereof in the apparatus;

FIG. 3 is a top view of a portion of the device of this invention taken through section lines 3—3 of FIG. 2;

FIG. 4 is a sectional view of the device taken through lines 4—4 of FIG. 3 and particularly illustrating the means whereby a predetermined volume and direction of distribution of fluid is achieved;

FIG. 5 is a sectional view of the device taken through lines 5—5 of FIG. 4;

FIG. 6 is a top view of an alternative embodiment of the device for selective distribution of fluid at a utilization area;

FIG. 7 is a sectional view of the device of FIG. 6 taken through lines 7—7 thereof;

FIG. 8 is a sectional view of the alternative embodiment of the device taken through lines 8—8 of FIG. 6;

FIG. 9 is a perspective view of the device of FIG. 3 in the process of manufacture; and FIG. 10 is a sectional view of the device in the process of manufacture of FIG. 9 taken through lines 10—10 thereof and particularly illustrating the punch and dye used to selectively deform the thin plate adjacent the initially substantially perpendicular fluid passageways to thereby impart a predetermined angular orientation thereto.

DESCRIPTION OF THE INVENTION

A portion of an apparatus of this invention 20 for movement of articles 22, herein a mass conveyor for movement of cylindrical articles (for example beverage cans), is shown in FIG. 1. While a mass conveyor is illustrated herein, it will be realized by those skilled in the art that the principles herein described could be applied to a variety of apparatus for movement of articles, for example air tables, single filers, article orienting apparatus and the like.

Apparatus 20 includes the now preferred embodiment of device 25 for selective distribution of fluid (typically air) to a preselected utilization area 27 for causing movement of articles 22 thereat. Distribution device 25 includes thin plate 29, establishing oppositely facing surfaces 31 and 33, and a plurality of spaced air jets 35. Apparatus 20 also includes plenum 37 for containment of air at a second preselected area 38 adjacent to utilization area 27, having inwardly facing flanges 39 at side walls 41 and 43, and bottom wall 45, with top wall 47 of plenum 37 being formed by thin plate 29. Fluid supply duct 50 supplies fluid (typically air) to plenum 37 through compressor plenum 52, housing a conventional air compressor for example, for maintaining fluid in plenum 37 under pressure (preferably at a static pressure of between 0.002 and 0.005 atmospheres) thereby establishing a pressure differential between utilization area 27 and second preselected area 38.

Cover 55 having vent holes 57 is provided above utilization area 27, maintained thereat on mounting bars 59 by, for example, screws 61. Mounting bars 59 are attached between adjustable mounting arms 63 by, for example, bolting, welding, or the like.

Mounting arms 63 are adjustably attachable to opposite side walls 41 and 43 of plenum 37 using bolts 65 through slides 67 in mounting arms 63 (only two mounting arms 63 being shown in FIGS. 1 and 2, it being realized that a plurality of such mounting arms 63 at both sides 41 and 43 of plenum 37 are utilized).

As shown in FIGS. 1 and 2, mounting arms 63 are attached to side retaining rails 71 and 72 by conventional means, for example bolts 73, or by rivets, welding, or the like. Side rails 71 and 72 provide means for retaining articles 22 at utilization area 27 as articles are being moved between upstream portion 75 and downstream portion 77 of utilization area 27 by distribution of fluid thereat.

Sealing strips 79 are positioned between thin plate 29 and flanges 39 of side walls 41 and 43 of plenum 37 for sealing fluid within the plenum when the bottom portion 81 of side rails 71 are brought into clamping contact with the outer portions 83 and 84 of thin plate 27, thereby clamping thin plate 27 between bottom portion 81 of side rails 71 and flanges 39 to thereby maintain thin plate 27 therebetween upon tightening of bolts 65 through slides 67 of adjustable mounting arms 63.

Turning now to FIGS. 2 through 5, the device 25 for selective distribution of fluid to utilization area 27 is illustrated in greater detail. As shown in FIG. 2, jets 35 impart an angular orientation to fluid passing therethrough from plenum 37. As shown in FIGS. 2 through 5, thin plate 29 is deformed at regular spatial intervals to thereby provide spaced displacements 85 in the plate. Spaced, cup-shaped, depressions 90 are provided in a predetermined portion of upper surface 31 of thin plate 29. Predetermined portions of lower surface 33 of thin plate 29 has protuberances 94 corresponding to the depressions 90 in upper surface 31 caused by deformation of thin plate 29. The predetermined portions of surfaces 31 and 33 provide a reference for first and second reference planes 31' and 33' respectively, herein shown as being coextensive with surfaces 31 and 33 (it being understood that planes 31' and 33' could be differently oriented for reference purposes).

Openings 96 are positioned in thin plate 29 so that openings 96 provide at the predetermined portions of surfaces 31 and 33 passageways 98 through thin plate 29 positioned in depressions 90. Openings 96 are made by perforating plate 29 before deformation of plate 29 to provide depressions 90. The resulting passageways 98 thus extend substantially normal with respect to planes 31' and 33' (and, thus, herein to surfaces 31 and 33 of plate 29) before deformation of the plate. The resulting overall angular orientation of passageways 98 with respect to planes 31' and 33', and so to plate 29, is imparted to the passageways upon deformation of plate 29 to provide depressions 90 as shown in FIG. 4.

The openings in plate 29 are of a preselected size for passage of a predetermined volume of fluid through the passageways. For example, with a static pressure of 2 inches of water maintained at plenum 37, the circular openings in plate 29 having a diameter of 0.0625 inches, and with 288 openings per square foot of plate 29, a fluid flow through the openings of 34.704 cubic feet per minute per square foot would be produced. Maintaining the same static pressure, and the same number of openings per square foot of plate 29, an opening having a diameter of 0.073 inches would produce a flow of 47.318 cfm per square foot, an opening having a diameter of 0.093 inches would produce a flow of 76.838 cfm per square foot, an opening having a diameter of 0.125 inches would produce a flow of 138.844 cfm per square foot, and an opening having a diameter of 0.136 would produce a flow of 164.35 cfm per square foot.

As shown in FIG. 4, the centers 101 of depressions 90 are offset from the centers 103 of passageways 98, thus selectively imparting an overall angular orientation to passageways 98 upon selective deformation of plate 29 (with angularity being in part predetermined by the amount of offset). The configuration of the depressions is selected, with the depth and breath of the configuration of the depressions also effecting the overall angular orientation of passageways 98 and thus, in combination with the selected offset, the direction of distribution of fluid. For example, selectively deforming plate 29 to provide depressions having a depth of between 0.0625 and 0.2 inches, and a breath of 0.4 to 0.6 inches, and with the center 101 of the depression being offset from the center 103 of passageway 98 from between 0.080 to 0.120 inches will effect an angular orientation in passageways 98 of between 15 and 45 degrees from a line drawn perpendicular to plane 31' at surface 31 of plate 29 (such angular orientations being preferable for movement of articles such as beverage cans).

For use in a mass conveyor, it is preferable that the angular orientation imparted to passageways 98 be the same for each such passageway, and that the passageways be substantially parallel with each other, producing an angular orientation, preferably having a downstream component (though other orientations may be desirable). The plurality of passageways and depressions are typically oriented at regular spatial intervals in rows, with alternate rows being offset from the immediately proceeding and following rows.

For example, as partially illustrated in FIG. 3, a first row 108 of jets 35 (for example arranged 12 in a row with passageways 98 being spaced a distance of 1 inch apart) is provided, followed by a substantially identically spaced row 110 spaced from row 108, so that rows of passageways 98 are spaced a distance of one-half inch apart, for example, but with jets 35 in row 110 being laterally offset from jets in row 108 and from the following row (not shown), thereby providing a spacing between air jets 35 of at least ½ inch.

FIGS. 6 through 8 show an alternative embodiment 111 of the device for selected distribution of fluid. Jets 35 have a substantially similar structure as previously described in the preferred embodiment heretofore, but with the jets being spaced so that the distance therebetween is greater than heretofore previously described (for example, 1 inch apart), and with additional openings 115 for providing an additional plurality of passageways 118 being interspersed between jets 35. Passageways 118, because they are not associated with a selectively deformed portion of plate 29, provide jets 112 which are substantially perpendicularly oriented with respect to surface 31 of plate 29, thereby providing a corresponding perpendicular air flow for imparting additional lift to articles passed over plate 29 to thus compensate for the greater distances between jets 35.

FIGS. 9 and 10 illustrate a method of manufacturing a device 25 of this invention. Thin plate 29, for example a 14 gauge stainless steel plate, is provided having surface areas at surfaces 31 and 33 of sufficient size to be utilized at the utilization area 27. Plate 29 is then perforated for causing openings 96 at regular spatial intervals (for example using a programmable punch, for example a Trumph model 180W CNC programmable punching machine having a numerical controller, and appropriately sized perforating punch and dye).

Thereafter, the programmable punch is reset for application of dimpling punch 120 and dye 122 thereto with the desired degree of offset of the crown 124 of dye 122 from passageway 98 being programmed for selectively deforming the plate to make space displacements 85 having depressions 90 and protuberances 94 in surfaces 31 and 33 respectively of plate 29. By maintaining the same spatial intervals when perforating the plate and when deforming the plate to form the depressions therein but with the position of the crown 124 of dye 122 offset (to in part produce the desired flow direction of the fluid through the plate) a substantially similar angular configuration may be imparted to each of the passageways 98.

In operation, when plate 29 is positioned adjacent plenum 37 (as shown in FIGS. 1 and 2) air entering the plenum and maintained therein under pressure passes through the passageways 98 with the passage therethrough imparting to the fluid a substantially angular orientation corresponding to the angular orientation of the passageways, thereby providing lift to articles 22 and urging the articles in a direction predetermined by preselection of the configuration of the depressions and the amount of offset of the passageways from the center of the depressions.

As may be appreciated, a number of devices 25 for selective distribution of fluid may be provided for use in any particular system, with each of the devices being manufactured to produce different predetermined volume and direction (and thus velocity) of flow characteristics for application with differently configured articles to be moved through the utilization area. The devices thus having different characteristics are made readily interchangeable in an apparatus, such as apparatus 20 shown in FIG. 1, by provision of the adjustable mounting arms 63.

What is claimed is:

1. A device for selective distribution of fluid to a first preselected area from a second preselected area due to a pressure differential established therebetween, said device comprising:

fluid containment means having first and second readily separable portions, said first portion having first and second oppositely facing surfaces with said first surface facing toward said first preselected area;

clamping means having an engaging section and a mounting section movably attached to said second portion of said fluid containment means for releasably clamping said first portion of said fluid containment means between said second portion of said fluid containment means and said engaging section of said clamping means;

a plurality of passageways extending between first openings in a predetermined portion of said first surface and second openings in a predetermined portion of said second surface, with said passageways extending substantially normal with respect to a first plane passing through said predetermined portion of said first surface and a second plane passing through said predetermined portion of said second surface, and with said passageways receiving fluid from said second preselected area through said second openings and discharging fluid to said first predetermined area through said first openings; and a plurality of depressions in said predetermined portion of said first surface with each of said plurality of depressions having at least one of said first openings therein whereby fluid flow to said first preselected area from said second preselected area through said plurality of passageways is effectively angularly oriented with respect to said first plane passing through said predetermined portion of said first surface.

2. The device of claim 1 wherein each of said passageways is spaced at least one-half inch from any other said passageway, and wherein said angular orientation of said fluid flow is imparted by the position of said plurality of passageways in said spaced depressions and is between 15° and 45° from a line running perpendicular to said first plane.

3. The device of claim 2 wherein said depressions are cup-shaped depressions having a center, and wherein said angular orientation is achieved by offsetting said center of said cup-shaped depressions from said first openings in said predetermined portion of said first surface.

4. The device of claim 1 wherein said openings have a diameter of between 0.0625 and 0.136 inches, and wherein said fluid is contained by said fluid containment means at said second preselected area at a static pressure of between 0.002 and 0.005 atmospheres.

5. The device of claim 1 wherein said plurality of passageways are arranged in rows of spaced passageways, with alternate rows of spaced passageways being laterally offset from immediately preceding and immediately following rows.

6. The device of claim 1 wherein said first and second oppositely facing surfaces are established by a thin stainless steel plate.

7. The device of claim 6 wherein said plurality of depressions in said first surface have a corresponding plurality of protuberances in a predetermined portion of said second oppositely facing surface.

8. The device of claim 1 further comprising a second plurality of passageways extending between first openings in said first surface and second openings in said second surface said passageways extending substantially perpendicularly relative to said first and second planes, each of said second plurality of passageways being interspersed between different ones of said plurality of depressions.

9. The device of claim 1 wherein said second portion of said fluid containment means includes first and second walls held in a spaced relation and wherein said first and second surfaces of said first portion of said fluid containment means are positioned between said first and second walls, and further comprising first and second retaining means attached to said clamping means and having said engaging section of said clamping means positioned thereat, said retaining means defining opposing sides of said first preselected area for maintaining articles therein, wherein said first and second walls of said second portion of said fluid containment means each include flanges upon which said first portion of said fluid containment means is positionable, and wherein sealing means are positionable between said flanges and said first portion of said fluid containment means adjacent to said flanges.

10. The device of claim 9 wherein said mounting section of said clamping means includes adjustable attachment means for adjusting the position of said retaining means, and wherein said engaging section of said clamping means is moved by adjustment of said adjustable attachment means to provide for selective clamping and releasing of said first portion of said fluid containment means.

11. The apparatus of claim 10 wherein said fluid containment means further comprises at least a third portion readily interchangeable with said first portion of said fluid containment means and having at least one of depressions having a different configuration from said depressions in said first surface of said first portion, openings in said depressions positioned so that said openings therein are differently positioned from the position of said first openings in said depressions of said first portion, and a plurality of passageways therein having a different diameter from said passageways in said first portion, so that when said third portion is releasably clamped between said flanges of said first and second walls of said second portion of said fluid containment means and said engaging section of said clamping means said fluid is distributed in at least one of different preselected directions and different volumes at said first preselected area from said distribution effected by said first portion.

12. In an apparatus for movement of articles in a utilization area, said apparatus including air containment means and air supply means for supplying air to said air containment means for containment thereof under pressure, air distribution means for distribution in predetermined directions and at predetermined angles relative to said air distribution means of a predetermined volume of air from said containment means at said utilization area for movement of said articles thereat, said air distribution means comprising a thin plate sealably positionable adjacent to said containment means thereby forming one part thereof and having first and second oppositely facing surfaces, said first surface being adjacent to said articles at said utilization area and said second surface facing inwardly to said air containment means, said thin plate having a plurality of spaced openings therethrough between said first and second surfaces and a plurality of spaced curvilinear displacements at said first and second surfaces, each of said plurality of displacements being positioned so that a different one of said plurality of openings is selectively positioned therein so that said position of said openings in said displacements determines said directions and said angles of distribution of air at said utilization area.

13. The air distribution means of claim 12 wherein said apparatus is a mass conveyor, wherein said articles are cylindrical cans, and wherein said predetermined angles are between 15 and 45 degrees from a line perpendicular to said first oppositely facing surface and wherein said predetermined directions have a down stream component relative to desired direction of flow of said cans on said mass conveyor.

14. The air distribution means of claim 12 wherein said predetermined volume of air is between 34 and 165 cubic feet per minute per square foot of said utilization area.

15. The air distribution means of claim 12 wherein said plurality of spaced openings are arranged in rows of spaced openings, and wherein alternate rows of openings are laterally offset from immediately preceding and immediately following rows.

16. A method of manufacturing a device for selective distribution at a utilization area of fluid maintained adjacent thereto due to a pressure differential established therebetween, said method comprising:
providing plate means having first and second oppositely facing surfaces with surface areas at least substantially coextensive with said utilization area;
perforating said plate means to provide a first plurality of spaced passageways therethrough, each of said passageways being substantially perpendicularly oriented with respect to said surfaces of said plate means; and
selectively deforming said plate means after perforating said plate means to provide a plurality of selectively positioned spaced displacements in said first and second surfaces of said plate means, said displacements in said first surface defining a plurality of spaced depressions, and said displacements in said second surface defining a plurality of corresponding spaced protuberances, the position of each of said selectively positioned spaced displacements being controlled so that at least one of said plurality of spaced passageways is positioned at a preselected location therein so that the configuration of said displacements and said preselected location of said passageways therein imparts an overall predetermined angular orientation to said passageways relative to said plate means.

17. The method of manufacturing a device for distribution of fluid of claim 16 wherein said method further comprises the step of further perforating said plate means to provide a second plurality of spaced passageways therethrough interspersed between said first plurality of spaced passageways and said plurality of spaced displacements, so that said second plurality of spaced passageways remains substantially perpendicularly oriented with respect to said plate means.

18. The method of manufacturing a device for distribution of fluid of claim 16 wherein said predetermined angular orientation is between 15 and 45 degrees from a line perpendicular to said first surface, and wherein said passageways are substantially parallel to each other.

19. The method of manufacturing a device for distribution of fluid of claim 16 wherein said step of perforating said plate means to provide a first plurality of spaced passageways further comprises perforating said plate means so that said passageways have a diameter of between 0.0625 and 0.136 inches so that a predetermined volume of fluid is distributed at said utilization area.

20. The method of of manufacturing a device for distribution of fluid of claim 19 wherein said predetermined volume of fluid is between 34 and 165 cubic feet per minute per square foot of said utilization area.

21. The method of manufacturing a device for distribution of fluid of claim 16 wherein said passageways and said displacements each have a center relative to said first surface of said plate means, wherein said step of perforating said plate means to provide a first plurality of spaced passageways therethrough includes the step of perforating said plate means at regular spatial intervals, and wherein the step of selectively deforming said plate means to provide a plurality of spaced displacements in said first and second surfaces of said plate means includes the step of selectively deforming said plate means to form curvilinear displacements at regular spatial intervals so that said centers of said plurality of spaced displacements are offset from said centers of said plurality of spaced passageways by an amount sufficient to achieve said predetermined angular orientation of said passageways.

22. The device produced by the method of manufacture of claim 16.

* * * * *